United States Patent
Haley et al.

(10) Patent No.: US 11,607,806 B2
(45) Date of Patent: Mar. 21, 2023

(54) TECHNIQUES FOR GENERATING CONTROLLERS FOR ROBOTS

(71) Applicant: AUTODESK, INC., San Francisco, CA (US)

(72) Inventors: Michael Haley, San Rafael, CA (US); Erin Bradner, San Francisco, CA (US); Pantelis Katsiaris, San Francisco, CA (US)

(73) Assignee: AUTODESK, INC., San Francisco, CA (US)

( * ) Notice: Subject to any disclaimer, the term of this patent is extended or adjusted under 35 U.S.C. 154(b) by 125 days.

(21) Appl. No.: 16/892,216

(22) Filed: Jun. 3, 2020

(65) Prior Publication Data

US 2021/0114206 A1 Apr. 22, 2021

Related U.S. Application Data

(60) Provisional application No. 62/924,051, filed on Oct. 21, 2019.

(51) Int. Cl.
*B25J 9/16* (2006.01)

(52) U.S. Cl.
CPC ............. *B25J 9/163* (2013.01); *B25J 9/1605* (2013.01); *B25J 9/1653* (2013.01); *B25J 9/1664* (2013.01); *B25J 9/1602* (2013.01)

(58) Field of Classification Search
None
See application file for complete search history.

(56) References Cited

U.S. PATENT DOCUMENTS

| | | | | |
|---|---|---|---|---|
| 4,763,276 A | * | 8/1988 | Perreirra | B25J 9/1653 |
| | | | | 700/254 |
| 5,959,861 A | * | 9/1999 | Kaneko | G05B 13/042 |
| | | | | 700/29 |

(Continued)

FOREIGN PATENT DOCUMENTS

WO 2018/199947 A1 11/2018

OTHER PUBLICATIONS

Newman W., Osborn D., "A New Method for Kinematic Parameter Calibration via Laser Line Tracking," 1993, IEEE, pp. 160-165 (Year: 1993).*

(Continued)

*Primary Examiner* — Ian Jen
*Assistant Examiner* — Karston G. Evans
(74) *Attorney, Agent, or Firm* — Artegis Law Group, LLP

(57) ABSTRACT

A model generator implements a data-driven approach to generating a robot model that describes one or more physical properties of a robot. The model generator generates a set of basis functions that generically describes a range of physical properties of a wide range of systems. The model generator then generates a set of coefficients corresponding to the set of basis functions based on one or more commands issued to the robot, one or more corresponding end effector positions implemented by the robot, and a sparsity constraint. The model generator generates the robot model by combining the set of basis functions with the set of coefficients. In doing so, the model generator disables specific basis functions that do not describe physical properties associated with the robot. The robot model can subsequently be used within a robot controller to generate commands for controlling the robot.

19 Claims, 6 Drawing Sheets

(56) References Cited

U.S. PATENT DOCUMENTS

| | | | | |
|---|---|---|---|---|
| 2004/0230325 | A1* | 11/2004 | Ramamoorthy | G05B 13/042 700/37 |
| 2010/0168919 | A1* | 7/2010 | Okamoto | B25J 9/1643 700/275 |
| 2011/0282169 | A1* | 11/2011 | Grudic | G06N 20/00 600/371 |
| 2016/0147201 | A1* | 5/2016 | Crncich-DeWolf | G06N 3/08 700/47 |
| 2017/0112580 | A1* | 4/2017 | Griffiths | B25J 19/0004 |
| 2018/0217575 | A1* | 8/2018 | Duan | G05B 19/41 |
| 2020/0070347 | A1* | 3/2020 | Denenberg | B25J 9/1674 |
| 2020/0171657 | A1* | 6/2020 | Baier | B25J 9/1633 |
| 2020/0281676 | A1* | 9/2020 | Rohs | A61B 34/20 |
| 2021/0003973 | A1* | 1/2021 | Chakrabarty | G06K 9/6271 |

OTHER PUBLICATIONS

Chang, P., Lee C., "Simplification of Robot Dynamic Model Based On System Performance," 1987, IEEE, Proceedings of the 26th Conference on Decision and Control, pp. 1017-1023 (Year: 1987).*

Siciliano et al., "Springer Handbook of Robotics", ISBN: 978-3-540-23957-4, e-ISBN: 978-3-540-30301-5, Berlin, Heidelberg, Springer-Verlag, 2007, pp. I-LIX.

Pechev, Alexandre N. "Inverse Kinematics without matrix inversion", IEEE International Conference on Robotics and Automation, May 19-23, 2008, pp. 2005-2012.

Figueredo et al., "Robust Hinf kinematic control of manipulator robots using dual quaternion algebra", arXiv:1811.05436v2, Sep. 17, 2019, pp. 1-19.

Miller III et al., "Application of a General Learning Algorithm to the Control of Robotic Manipulators", The International Journal of Robotics Research, DOI: 10.1177/027836498700600207, vol. 6, Issue 2, Article 84, 1987, pp. 84-96.

Levine et al., "Learning hand-eye coordination for robotic grasping with deep learning and large-scale data collection", DOI: 10.1177/0278364917710318, The International Journal of Robotics Research, vol. 37, Issue 4-5, 2018, pp. 1-16.

Thuruthel et al., "Model-Based Reinforcement Learning for Closed-Loop Dynamic Control of Soft Robotic Manipulators", IEEE Transactions on Robotics, DOI 10.1109/TR0.2018.2878318, vol. 35, Issue 1, Feb. 2019, pp. 1-11.

Zeng et al., "TossingBot: Learning to Throw Arbitrary Objects with Residual Physics", Robotics: Science and System XV, IEEE Transactions On Robotics, arXiv:1903.11239, 2019, pp. 1-13.

Prattichizzo et al., "On Motion and Force Control of Grasping Hands with Postural Synergies", Robotics: Science and Systems VI, 2010, 8 pages.

Artemiadis et al., "A biomimetic approach to inverse kinematics for a redundant robot arm", DOI 10.1007/s10514-010-9196-x, Autonomous Robots, vol. 29, 2010, pp. 293-308.

Katsiaris et al., "Modeling Anthropomorphism in Dynamic Human Arm Movements", IEEE/RSJ International Conference on Intelligent Robots and Systems, Oct. 18-22, 2010, pp. 3507-3512.

Liarokapis et al., "Learning Human Reach-to-Grasp Strategies: Towards EMG-based Control of Robotic Arm-Hand Systems", IEEE International Conference on Robotics and Automation, May 14-18, 2012, pp. 2287-2292.

Van Den Berg et al., "LQG-MP: Optimized Path Planning for Robots with Motion Uncertainty and Imperfect State Information", The International Journal of Robotics Research, DOI: 10.1177/0278364911406562, vol. 30, Issue 7, 2011, pp. 895-913.

Todorov et al., "A generalized iterative LQG method for locally-optimal feedback control of constrained nonlinear stochastic systems", In proceedings of the American Control Conference, Jun. 8-10, 2005, pp. 300-306.

Tedrake, Russ, "LQR-Trees: Feedback Motion Planning on Sparse Randomized Trees", Robotics: Science and Systems V, 2009, pp. 17-24.

Kaiser et al., "Sparse Identification of nonlinear dynamics for model predictive control on the low data limit", Proceedings of the Royal Society a, http://dx doi.org/10.1098/rspa.2018.0335, vol. 474, Issue 2219, 2018, pp. 1-25.

Williams et al., "A Data-Driven Approximation of the Koopman Operator: Extending Dynamic Mode Decomposition", Journal of Nonlinear Science, DOI 10.1007/s00332-015-9258-5, vol. 25, Issue 6, 2015, pp. 1307-1346.

Bruder et al., "Modeling and Control of Soft Robots Using the Koopman Operator and Model Predictive Control", Robotics: Science and System XV, Jun. 22-26, 2019, 10 pages.

Amanhoud et al., "A Dynamical System Approach to Motion and Force Generation in Contact Tasks", Robotics Science and System XV, Jun. 22-26, 2019, 10 pages.

Stulp et al., "Model-Free Reinforcement Learning of Impedance Control in Stochastic Environments", IEEE Transactions on Autonomous Mental Development, vol. 4, Issue 4, Dec. 2012, pp. 330-341.

Fong et al., "LSMR: An Iterative Algorithm for Sparse Least-Squares Problems", DOI. 10.1137/10079687X, SIAM Journal of Scientific Computing, vol. 33, No. 5, 2011, pp. 2950-2971.

International Search Report for application No. PCT/US2020/056538 dated Feb. 8, 2021.

Siciliano et al., "Robotics—Chapters 2-4", In: "Robotics", XP055615186, ISSN: 1439-2232, ISBN: 978-1-84628-642-1, Dec. 31, 2009, pp. 39-189.

Mooring et al., "Fundamentals of Manipulator Calibration", Wiley-Interscience, John Wiley & Sons, Inc., XP055768850, ISBN: 978-0-471-50864-9, Dec. 31, 1991, 341 pages.

Chen et al., "A positional error compensation method for industrial robots combining error similarity and radial basis function neural network", Measurement Science and Technology, IOP, XP020344399, ISSN: 0957-0233, DOI: 10.1088/1361-6501/AB3311, vol. 30, No. 12, Sep. 19, 2019, 10 pages.

Zhong, Xiaolin, "Robot Calibration Using Artificial Neural Networks—Ph.D. thesis", Chapters 4-7, XP055768852, Retrieved from the Internet:URL:https://core.ac.uk/download/pdf/236999203.pdf, Nov. 30, 1995, 184 pages.

\* cited by examiner

TECHNIQUES FOR GENERATING CONTROLLERS FOR ROBOTS

CROSS-REFERENCE TO RELATED APPLICATIONS

This application claims the priority benefit of U.S. provisional patent application titled, "Creating Robot Controllers Based on Sparse Learning for Robot Modeling and Control," filed on Oct. 21, 2019 and having Ser. No. 62/924,051. The subject matter of this related application is hereby incorporated herein by reference.

BACKGROUND

Field of the Various Embodiments

The various embodiments relate generally to control theory and robotics and, more specifically, to techniques for generating controllers for robots.

Description of the Related Art

In a typical robot controller design process, a designer analyzes the physical structure of a robot in order to determine a set of kinematic equations associated with the robot. The set of kinematic equations generally describes the physical properties of the robot, including various static and/or dynamic properties of one or more joints and/or linkages included in the robot. For example, a given kinematic equation could describe the position of an end effector included in the robot as a function of a joint angle associated with the robot.

Subsequently, the designer determines a Jacobian matrix for the robot by computing the time-based derivatives of the different kinematic equations. The Jacobian matrix generally relates one or more angular velocities associated with the joints of the robot to one or more linear and/or angular velocities associated with different portions of the robot, including the end-effector of the robot. The Jacobian matrix can then be used to generate a controller for the robot that maps a target position of the end effector to one or more changes in the joint angles of the robot. When implemented in the robot, the controller is able to direct the end effector towards the target position in response to various inputs.

One drawback of the above approach is that determining the set of kinematic equations associated with a robot is a complex manual process that oftentimes is simplified via one or more modeling approximations that could be somewhat inaccurate. For example, when determining the kinematic equation for a given linkage associated with a robot, the designer could make a rounding assumption that results in a somewhat inaccurate approximation of the moment of inertia of the linkage. These types of inaccurate modeling approximations can lead to inaccuracies in the Jacobian matrix on which the controller for the robot is based that can prevent the controller from accurately controlling the robot.

Another drawback of the above approach is that some or all of the physical structure of the robot may be hidden from the designer. For example, a given robot could be manufactured with specific joints and/or linkages enclosed within a housing that prevents the designer from inspecting those joints and/or linkages. If the designer is unable to analyze the physical structure of the robot, then the designer cannot determine either the corresponding set of kinematic equations for the robot or the Jacobian matrix for the robot, thus preventing the designer from generating a controller for the robot.

As the foregoing illustrates, what is needed in the art are more effective techniques for generating controllers for robots.

SUMMARY

Various embodiments include a computer-implemented method for controlling a robot, including determining a first set of outputs generated by the robot in response to a first set of inputs, generating a first set of basis functions based on the first set of inputs and the first set of outputs, where the first set of basis functions describes one or more physical characteristics of the first robot, and causing the robot to perform a first action based on the first set of basis functions.

At least one technical advantage of the disclosed techniques relative to the prior art is that the disclosed techniques enable accurate robot controllers to be generated without having to determine any kinematic equations. Accordingly, situations where inaccurate robot controllers result from inaccurate modeling assumptions can be avoided.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1A:
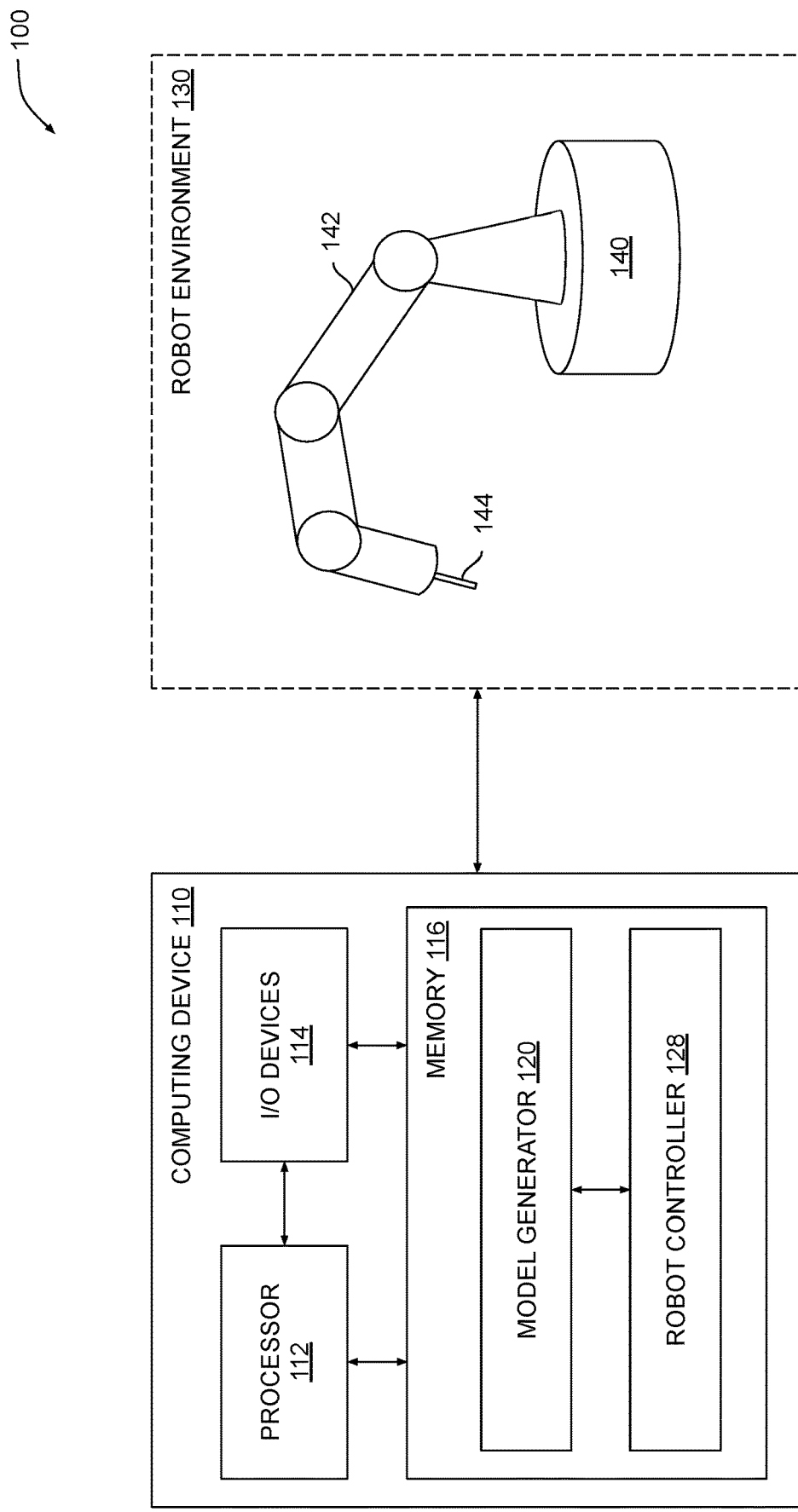
FIGS. 1A-1B illustrate a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

As noted above, when generating a robot controller, a designer first determines a set of kinematic equations that describe a robot, and then generates a Jacobian matrix that can be used to map a target position for an end effector to changes in joint angles that move the end effector towards the target position. However, determining the set of kinematic equations associated with the robot is a complex manual process that is oftentimes simplified via one or more potentially inaccurate modeling approximations. These inaccurate modeling approximations generally lead to inaccuracies in the Jacobian matrix that, in turn, prevent the controller from accurately controlling the robot. In addition, under some circumstances, some or all of the physical structure of the robot may be hidden from the designer, thereby preventing the designer from analyzing the physical structure of the robot. Without being able to analyze the physical structure of the robot, the designer cannot determine the corresponding set of kinematic equations or generate the Jacobian matrix for the robot, and therefore cannot generate a controller capable of controlling the robot.

To address these issues, various embodiments include a model generator that implements a data-driven approach to generating a robot model. The robot model can be used within a robot controller to generate commands for controlling the robot. The model generator generates a set of basis functions that generically describes various physical properties of a wide range of systems. The model generator then generates a set of coefficients corresponding to the set of basis functions based on one or more commands issued to the robot and one or more corresponding end effector positions. In one embodiment, the model generator may enforce a sparsity constraint on the set of coefficients in order to disable at least some of the basis functions. The model generator generates the robot model by combining the set of basis functions with the set of coefficients. In doing so, the model generator disables specific basis functions that do not describe physical properties associated with the robot.

The robot controller implements an iterative control loop in order to move the end effector of the robot from a current position associated with a current set of joint angles to a target position using the robot model. When implementing the iterative control loop, the robot controller computes an error between the current position of the end effector and the target position. If the error exceeds a threshold value, the robot controller computes a set of joint angle velocities based on the error value. The robot controller then computes a set of end effector velocities based on the set of joint angle velocities, a current set of joint angles, and the robot model. Based on the current position of the end effector and the set of end effector velocities, the robot controller updates the end effector position and recomputes the error value. When the error value falls beneath the threshold value, the iterative control loop is complete.

At least one technical advantage of the disclosed techniques relative to the prior art is that the disclosed techniques enable accurate robot controllers to be generated without having to determine any kinematic equations. Accordingly, situations where inaccurate robot controllers result from inaccurate modeling assumptions can be avoided. Another technical advantage is that the disclosed techniques can be used to generate a controller for a robot without any knowledge of the physical structure of the robot. Accordingly, the disclosed techniques can be implemented in situations where some or all of the robot structure cannot be observed and/or analyzed. These technical advantages represent one or more technological advancements over prior art approaches.

System Overview

Figure 1B:
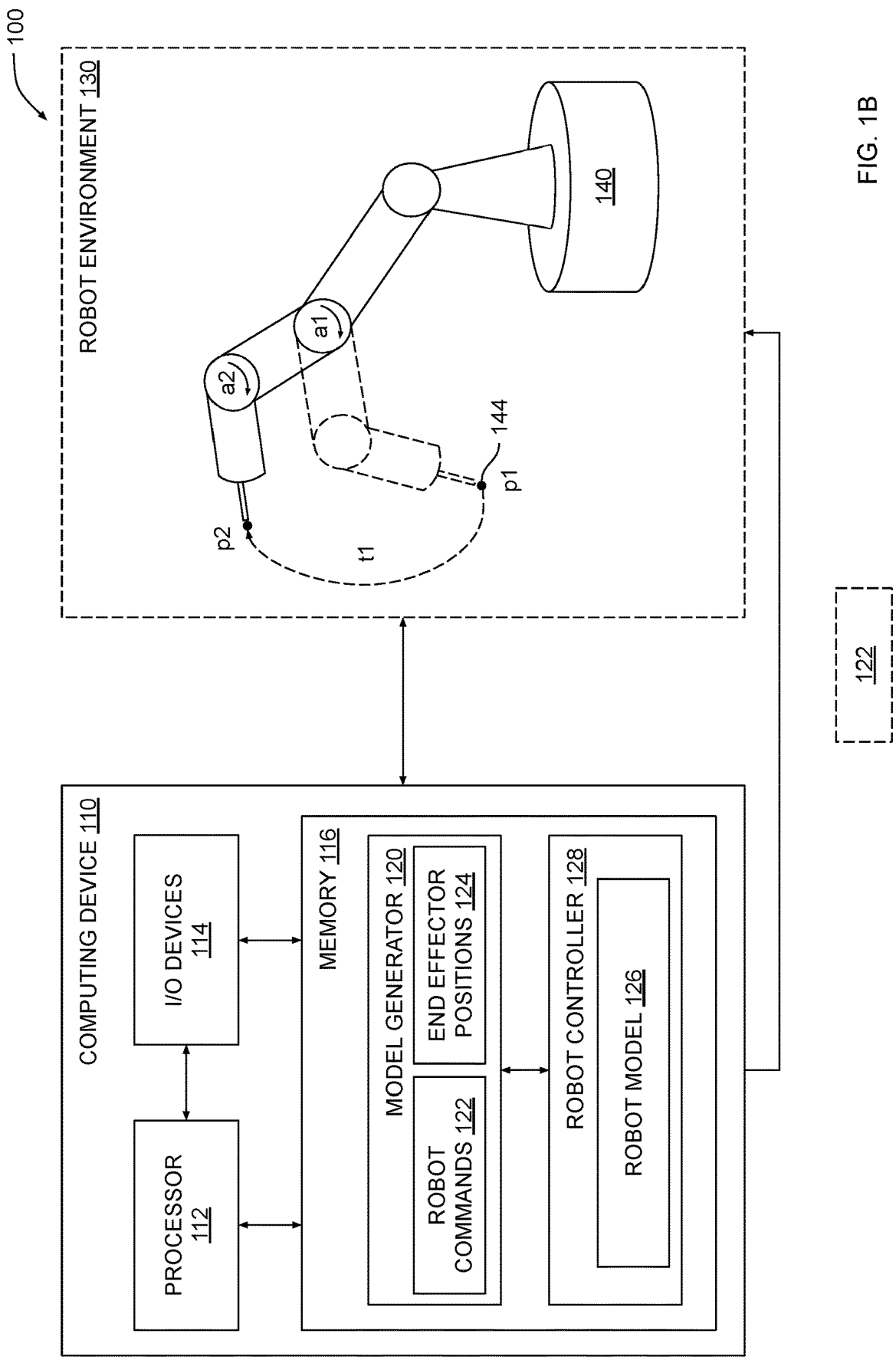

FIGS. 1A-1B illustrate a system configured to implement one or more aspects of the various embodiments. As shown in FIG. 1A, a system 100 includes a computing device 110 coupled to a robot environment 130. Computing device 110 may be any technically feasible type of computer system, including a desktop computer, a laptop computer, a mobile device, a virtualized instance of a computing device, a distributed and/or cloud-based computer system, and so forth. Robot environment 130 may be any technically feasible environment configured to include one or more robots, such as a robot cell, among others.

As further shown, computing device 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs). I/O devices 114 include any technically feasible set of devices configured to perform input and/or output operations, including, for example, a display device, a keyboard, and a touchscreen, among others.

Memory 116 includes any technically feasible storage media configured to store data and software applications, such as, for example, a hard disk, a random-access memory (RAM) module, and a read-only memory (ROM). Memory 116 includes a model generator 120 and a robot controller 128. Model generator 120 and robot controller 128 are configured to interoperate to control a robot 140 that resides within robot environment 130. Robot 140 includes a multi-jointed arm 142 and an end effector 144. In operation, model generator 120 and robot controller 128 are configured to interoperate to generate a model of robot 140 and to use that model to control the position of end effector 144, as described in greater detail below in conjunction with FIG. 1B.

Referring now to FIG. 1B, as shown, model generator 120 includes robot commands 122 and end effector positions 124. Robot commands 122 specify joint angle velocities that, when transmitted to robot 140, cause robot 140 to implement joint angle changes a1 and a2. In response to these joint angle changes, end effector 144 moves from position p1 to position p2 along trajectory t1. End effector positions 124 indicate positions p1, p2, and/or trajectory t1. As also shown, robot controller 128 includes robot model 126. Robot model 126 is a data-driven mapping that relates joint angles and/or joint angle velocities associated with robot 140 to changes in the position of end effector 144.

In operation, model generator 120 generates robot commands 122 and transmits these commands to robot 140, thereby causing robot 140 to modify the position of end effector 144. Model generator 120 then generates end effector positions 124 to indicate how the position of end effector 144 changes in response to those commands. Accordingly, robot commands 122 and end effector positions 124 represent a set of inputs provided to robot 140 and a corresponding set of outputs that robot 140 generates in response to those inputs. In one embodiment, model generator 120 may generate a plurality of robot commands 122 that causes end effector 144 to occupy some or all possible positions within robot environment 130. In another embodiment, robot environment 130 may include sensors configured to detect the position of end effector 144 within robot environment 140 upon moving in response to a given robot command 122.

Based on robot commands 122 and end effector positions 124 (among other data), model generator 120 generates robot model 126, as described in greater detail below in conjunction with FIGS. 2-3. Subsequently, robot controller 128 is configured to implement an iterative control loop using robot model 126 in order to move end effector 144 from a current position to a target position, as described in greater detail below in conjunction with FIGS. 4-5.

Referring generally to FIGS. 1A-1B, via the disclosed techniques, model generator 120 is configured to model the physical properties of robot 140 without needing to first determine kinematic equations corresponding to robot 140. Instead, model generator 120 implements a data-driven approach based on inputs provided to robot 140 and corresponding outputs. Accordingly, the disclosed techniques help to avoid inaccuracies that can result from incorrect modeling assumptions, as found with prior art techniques. Further, the disclosed techniques can be implemented even when the physical structure of robot 140 is unavailable or otherwise unknown. In one embodiment, model generator 120 may generate robot model 126 to describe the physical properties of flexible portions of robot 140 or other portions of robot 140 that cannot easily be modeled using conventional techniques. As a general matter, any of the techniques described above can be applied to any technically feasible type of robot. Persons skilled in the art will understand that the specific type of robot described in conjunction with FIGS. 1A-5 is presented for illusory purposes and not meant to limit the scope of the various embodiments.

Model Generator

Figure 2:
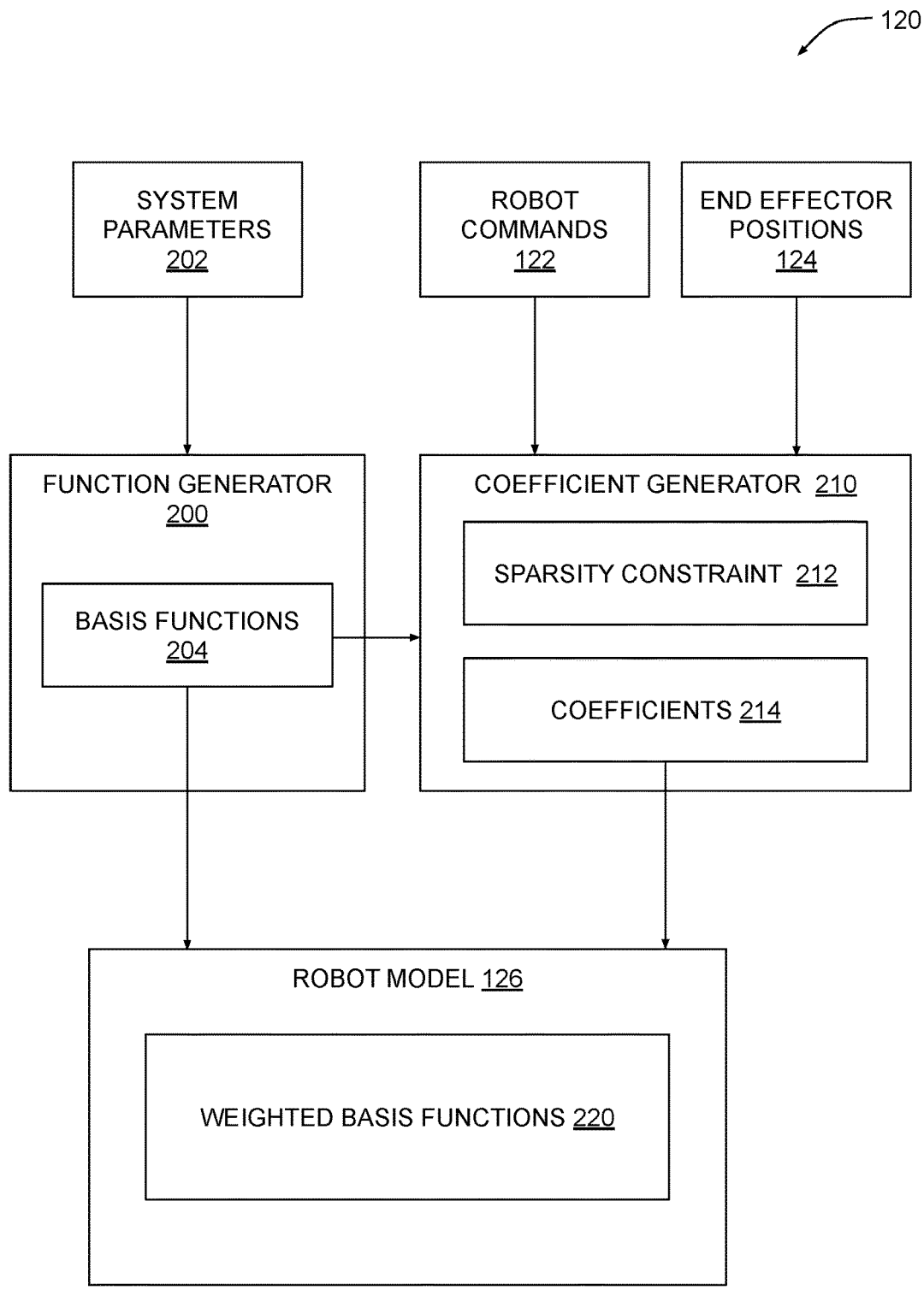
FIG. 2 is a more detailed illustration of the model generator of FIGS. 1A-1B, according to various embodiments.

FIG. 2 is a more detailed illustration of the model generator of FIGS. 1A-1B, according to various embodiments. As shown, model generator 120 includes a function generator 200 and a coefficient generator 210.

Function generator 200 is a software module that is configured to analyze system parameters 202 to generate basis functions 204. System parameters 202 can include any technically feasible data that describes any attribute of robot 140. For example, system parameters 202 may indicate a robot type associated with robot 140, a type of motion implemented by robot 140, one or more structural attributes of robot 140, one or more functional characteristics of robot 140, and so forth. In one embodiment, function generator 200 may implement a machine learning model and/or neural network in order to map system parameters 202 to basis functions 204. In another embodiment, system parameters 202 may be omitted, and function generator 200 may instead select a default set of basis functions 204 or, alternatively, receive a set of basis functions 204 from a user.

Basis functions 204 include a range of different functions that describe various types of physical motion. For example, a given basis function could include a combination of trigonometric functions (e.g., sine, cosine, etc.) in order to describe oscillatory motion associated with one or more portions of robot 140. Each basis function 204 can be expressed as a differential equation, partial differential equation, or any other type of mathematical expression. As a general matter, basis functions 204 may include any technically feasible combination of mathematical terms capable of describing any type of physical motion.

Coefficient generator 210 is configured to analyze basis functions 204 in conjunction with robot commands 122 and end effector positions 124 to generate coefficients 214. Each coefficient corresponds to a different basis function 204 and indicates a degree to which the corresponding basis function 204 describes one or more physical properties of robot 140. In one embodiment, each coefficient 214 may be a decimal value that provides a weight for each basis function 204. In another embodiment, each coefficient 214 is a binary value indicating whether the corresponding basis function 204 is active or inactive.

In one embodiment, coefficient generator 210 may generate coefficients 214 by implementing a least squares identification algorithm or other optimization algorithm based on robot commands 122 and end effector positions 124 in order to determine coefficients 214 that, when applied to basis functions 204, cause those basis functions to predict end effector positions 124 based on robot commands 122. In doing so, coefficient generator 210 may apply sparsity constraint 212 via a sparse learning process in order to reduce and/or minimize the number of non-zero coefficient values. In another embodiment, coefficient generator 210 implements a machine learning model and/or neural network in order to generate coefficients 214. The machine learning model and/or neural network could be trained, for example, based on a manually curated set of basis functions developed during analysis of a range of different types of robots. When generating coefficients 214, coefficient generator 210 may generate an initial set of coefficients and then update those coefficients using any of the techniques described above.

Function generator 200 and coefficient generator 210 combine basis functions 204 with coefficients 214 to generate a set of weighted basis functions 220 included in robot model 126. Each weighted basis function 220 models the physical characteristics of one or more portions of robot 140 to a given degree. In one embodiment, weighted basis functions 220 includes only a subset of basis functions 204 for which non-zero coefficients 214 are generated.

Because robot model 126 is generated based on robot commands 122 and end effectors positions 124, kinematic equations need not be generated to describe the behavior of robot 140 and a Jacobian matrix does not need to be computed in order to generate a controller for robot. One technique for implementing a controller for robot 140 is described below in conjunction with FIGS. 4-5. The techniques described above in conjunction with FIG. 2 are described in greater detail below in conjunction with FIG. 3.

Figure 3:
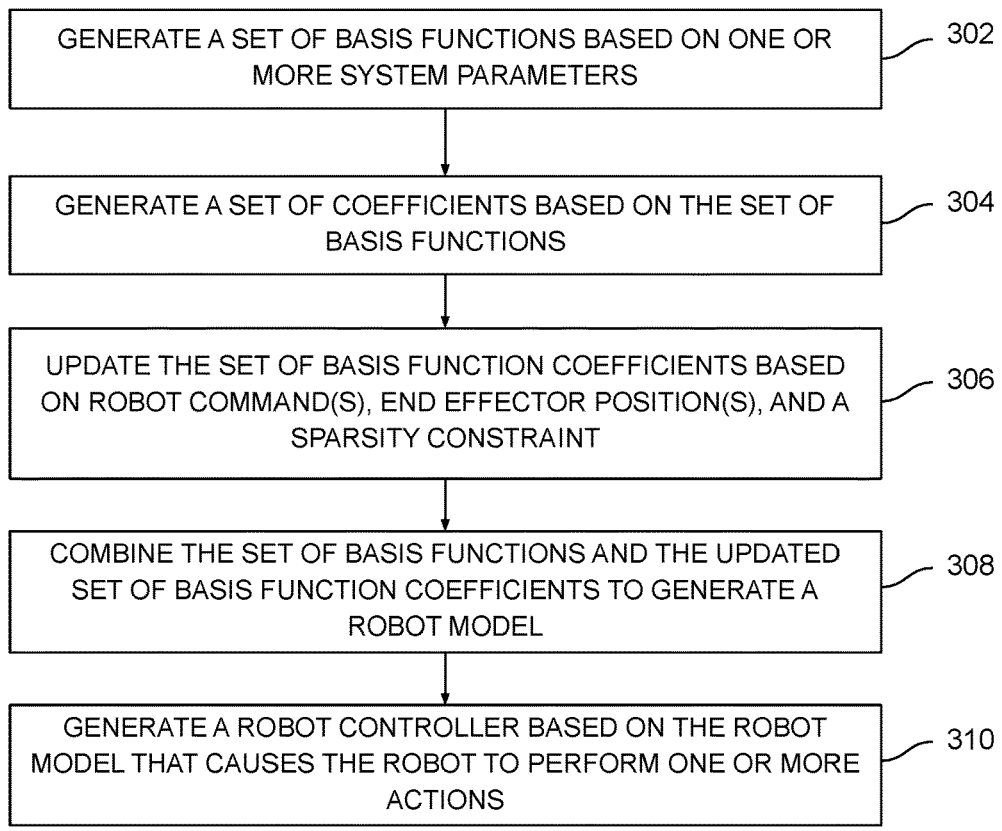
FIG. 3 is a flow diagram of method steps for generating a robot model for controlling a robot, according to various embodiments.

FIG. 3 is a flow diagram of method steps for generating a robot model for controlling a robot, according to various embodiments. Although the method steps are described in conjunction with the systems of FIGS. 1A-2, persons skilled in the art will understand that any system configured to perform the method steps in any order falls within the scope of the present embodiments.

As shown, a method 300 begins at step 302, where function generator 200 within model generator 120 generates a set of basis functions 204 based on one or more system parameters 202. In various embodiments, system parameters 202 can be omitted and function generator 200 may select a default set of basis functions 204 or receive a set of basis functions 204 from a user. Basis functions 204 include a range of different functions that describe various types of physical motion. For example, a given basis function could include a partial differential equation that is defined relative to one or more joint angles and/or angular rates associated with robot 140.

At step 304, coefficient generator 210 within model generator 120 generates a set of coefficients 214 based on basis functions 204. Each coefficient 214 corresponds to a different basis function 204. Coefficient generator 210 may generate an initial set of coefficients and then subsequently update the initial set of coefficients.

At step 306, coefficient generator 210 updates the set of basis function coefficients based on one or more robot commands 122, one or more corresponding end effector positions 124, and sparsity constraint 212. Once updated, each coefficient 214 indicates a degree to which the corresponding basis function 204 describes one or more physical properties of robot 140. In one embodiment, coefficient generator 210 may generate coefficients 214 by implementing a least squares identification algorithm or other optimization algorithm based on robot commands 122 and end effector positions 124 to determine coefficients 214 that, when applied to basis functions 204, cause those basis functions to predict end effector positions 124 based on robot commands 122.

At step 308, coefficient generator 200 and function generator 210 interoperate to combine the set of basis functions and the updated set of coefficients to generate weighted basis functions 220 within robot model 126. Robot model 126 is a data-driven model that can be used to determine changes in position of end effector 144 in response to joint angles and/or changes in joint angles of robot 140. In one embodiment, one or more basis functions within weighted basis functions 220 may be assigned a weight of zero and are thereby disabled.

At step 310, robot controller 128 implements robot model 126 to cause robot 140 to perform one or more actions. In one embodiment, model generator 120 may generate robot controller 128 based on robot model 126. Robot controller 128 is configured to implement robot model 126 to control robot 140 in the manner described below in conjunction with FIGS. 4-5.

Robot Controller

Figure 4:
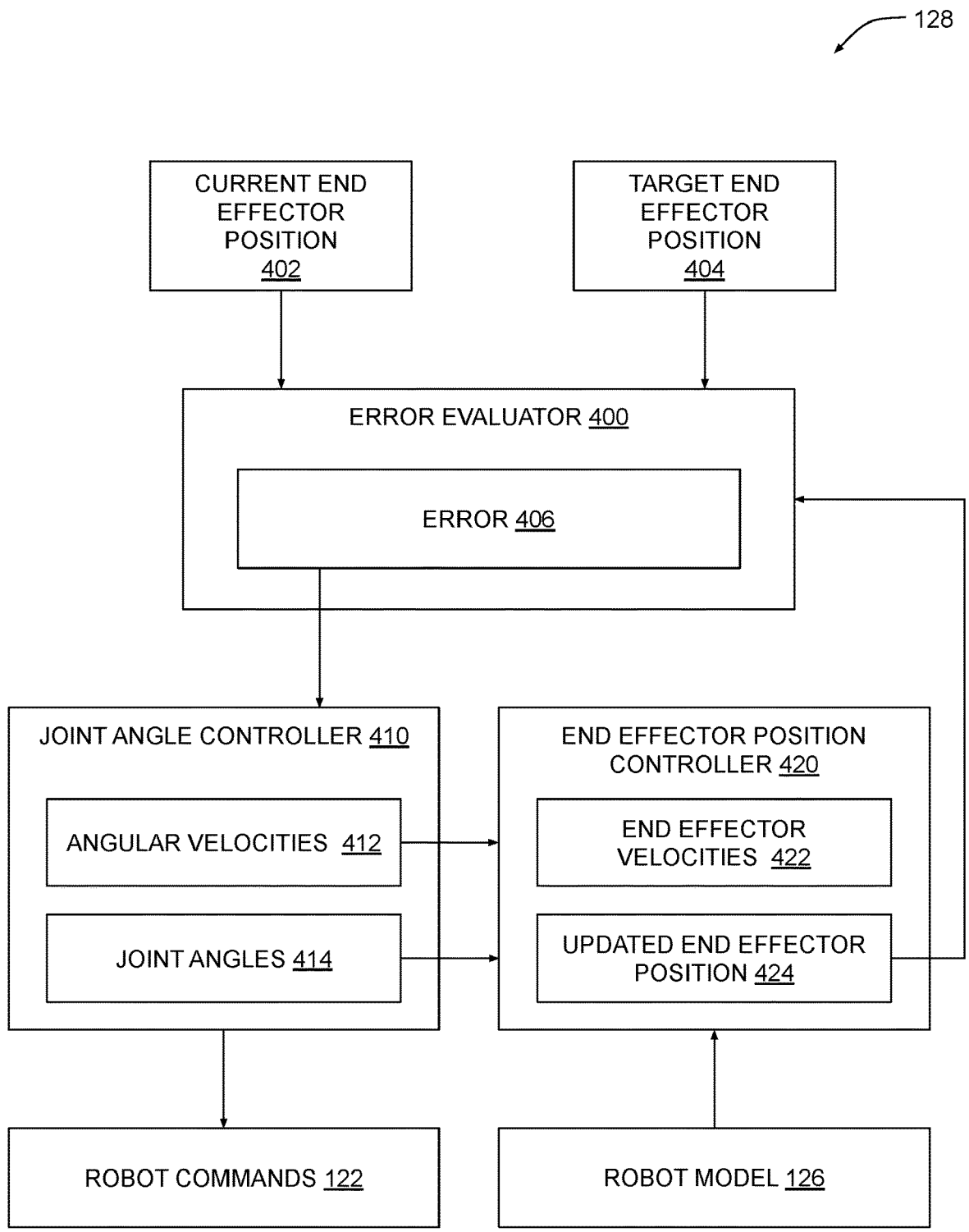
FIG. 4 is a more detailed illustration of the robot controller of FIGS. 1A-1B, according to various embodiments.

FIG. 4 is a more detailed illustration of the robot controller of FIGS. 1A-1B, according to various embodiments. As shown, robot controller 128 includes an error evaluator 400, a joint angle controller 410, and an end effector position controller 420. In operation, the various modules shown implement an iterative control loop in order to move end effector 144 from current end effector position 402 to target end effector position 404.

In particular, error evaluator 400 receives current end effector position 402 and target end effector position 404 and computes error 406. Each of current end effector position 402 and target end effector position 404 includes a set of three-dimensional (3D) Cartesian coordinates. Accordingly, error 406 may be a 3D vector originating at current end effector position 402 and terminating at target end effector position 404. Error evaluator 400 evaluates the magnitude of error 406 and determines whether that magnitude exceeds a threshold value. If the threshold value is not surpassed, error evaluator 400 does not initiate the iterative control loop. Otherwise, error evaluator 400 transmits error 406 to joint angle controller 410.

Joint angle controller 410 generates a set of angular velocities 412 based on error 406 and based on one or more gain matrices. In one embodiment, joint angle controller 410 implements a proportional-integral-derivative (PID) control algorithm using a set of positive definite gain matrices in order to generate angular velocities 412. Joint angle controller 410 may further generate robot commands 122 based on angular velocities 412 and output those commands to robot 140. Joint angle controller 410 determines joint angles 414 currently occupied by robot 140 and transmits angular velocities 412 and joint angles 414 to end effector position controller 420. Joint angle controller 410 subsequently updates joint angles 414 based on angular velocities 412.

End effector position controller 420 generates end effector velocities 422 based on angular velocities 412 and joint angles 414 using robot model 126. As discussed above in conjunction with FIGS. 2-3, robot model 126 is configured to map angular velocities and joint angles associated with robot 140 to specific changes in the position of end effector 144. End effector position controller 420 then processes end effector velocities 422 to generate updated end effector position 424. In doing so, end effector position controller 420 may approximate how the position of end effector 144 changes over a time interval when subject to end effector velocities 422.

End effector position controller 420 transmits updated end effector position 424 to error evaluator 400 in order to initiate a subsequent control process iteration. Subsequently, error evaluator 400 compares updated end effector position 424 to target end effector position 404 and updates error 406, and if the magnitude of error 406 exceeds the threshold value, then the iterative control loop repeats.

In the manner described, robot controller 128 uses robot model 126 to iteratively adjust the position of end effector 144 until that position is sufficiently similar to target end effector position 404. Unlike conventional controllers, robot controller 128 is configured to operate without using Jacobian matrices, and can therefore avoid inaccuracies and other inefficiencies caused by Jacobian matrices. The techniques described above in conjunction with FIG. 4 are described in greater detail below in conjunction with FIG. 5.

Figure 5:
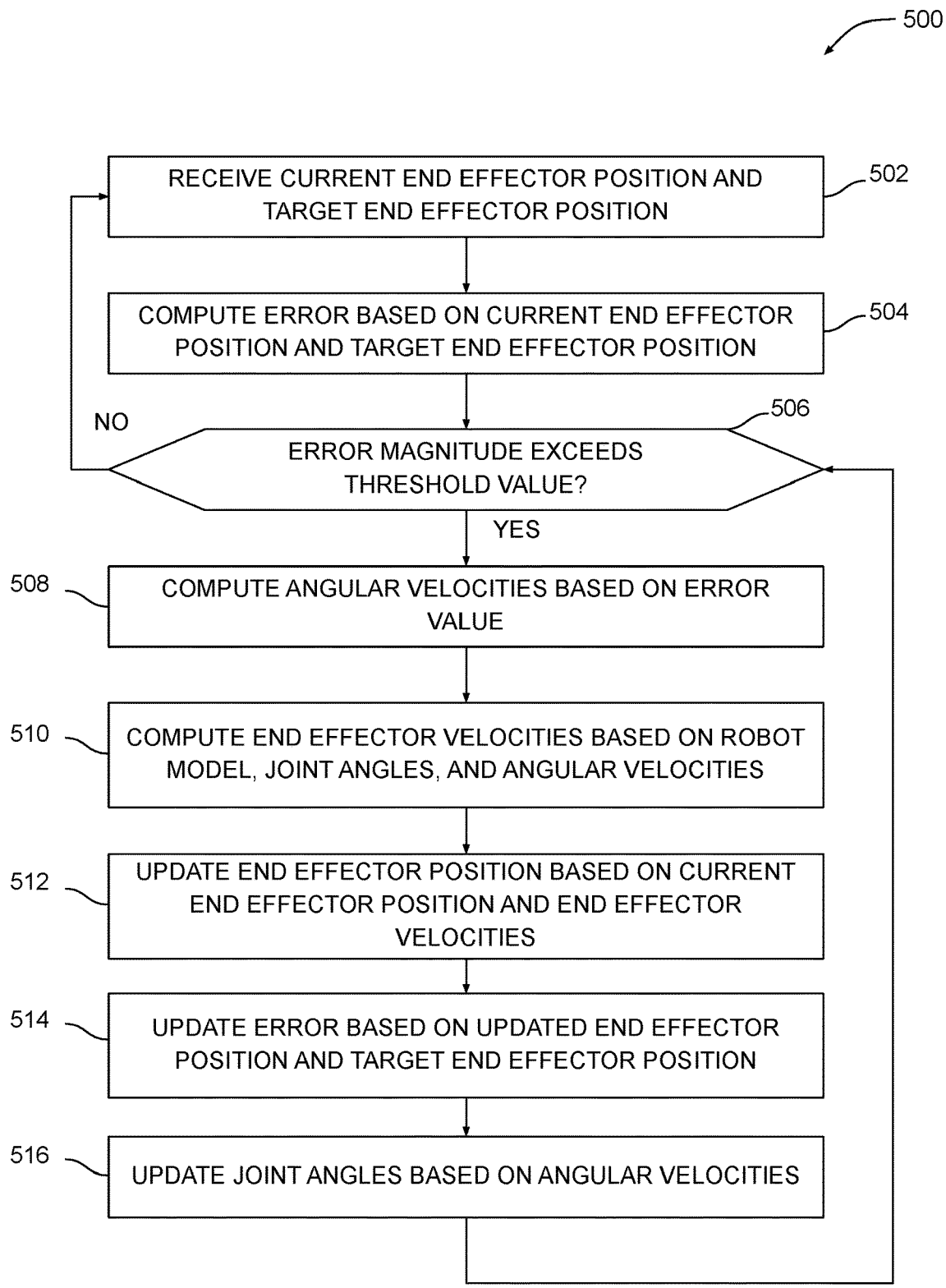
FIG. 5 is a flow diagram of method steps for controlling a robot, according to various embodiments.

FIG. 5 is a flow diagram of method steps for causing a robot to perform an action, according to various embodiments. Although the method steps are described in conjunction with the systems of FIGS. 1A-1B and 4, persons skilled in the art will understand that any system configured to perform the method steps in any order falls within the scope of the present embodiments.

As shown, a method 500 begins at step 502, where error evaluator 400 within robot controller 128 receives current end-effector position 402 and target end effector position 404. Current end effector position 402 can be a predetermined initial position associated with end effector 144 or, alternatively, the position of end effector 144 determined via one or more previous iterations of robot controller 128. Current end effector position 402 and target end effector position 404 are generally expressed as 3D Cartesian coordinates within a given frame of reference, although persons skilled in the art will understand that any technically feasible approach to representing positions may also be implemented.

At step 504, error evaluator 400 computes error 406 based on current end effector position 402 and target end effector position 404. Error 406 may be a 3D vector originating at current end effector position 402 and terminating at target end effector position 404. Error evaluator 400 evaluates the magnitude of error value in order to determine whether end effector 144 needs to be moved towards target end effector position 404.

Specifically, at step 506, error evaluator 400 compares the magnitude of error 406 to a threshold value. If the magnitude of error 406 does not exceed the threshold value, then the method 500 returns to step 502 and waits for another target end effector position to be received. Otherwise, if the magnitude of error 406 exceeds the threshold value, then the method 500 proceeds to step 508.

At step 508, joint angle controller 410 within robot controller 128 computes angular velocities 412 based on error 406. In doing so, joint angle controller 410 may implement a PID control algorithm using a set of positive definite gain matrices in order to generate angular velocities 412. Joint angle controller 410 may further generate robot commands 122 based on angular velocities 412 and output those commands to robot 140. Joint angle controller 410 determines joint angles 414 currently occupied by robot 140 and transmits angular velocities 412 and joint angles 414 to end effector position controller 420.

At step 510, end effector position controller 420 computes end effector velocities 422 based on robot model 126, joint angles 414, and joint angle velocities 412. As previously discussed, robot model 126 provides a mapping between angular velocities and joint angles associated with robot 140 and specific changes in the position of end effector 144. This mapping reflects one or more physical properties associated with robot 140 that are further specified within basis functions 204.

At step 512, end effector position controller 420 processes end effector velocities 422 to generate updated end effector position 424. In doing so, end effector position controller 420 may approximate how the position of end effector 144 changes over a time interval when subject to end effector velocities 422. Updated end effector position 424 can be used during a subsequent iteration of robot controller 128 in order to move end effector 144 towards a new target position or to refine the position of end effector 144.

At step 514, error evaluator 400 updates error 406 based on updated end effector position 424 and target end effector position 404. In doing so, error evaluator 400 compares updated end effector position 424 to target end effector position 404 using similar operations to those described above in conjunction with step 502.

At step 516, joint angle controller 410 updates joint angles 414 based on angular velocities 412 in order to prepare for a subsequent iteration of robot controller 128. In various embodiments, step 516 may occur following step 508. The method 500 then returns to step 502 and repeats in the manner described above.

In sum, a model generator implements a data-driven approach to generating a robot model that describes one or more physical properties of a robot. The model generator generates a set of basis functions that generically describes a range of physical properties of a wide range of systems. The model generator then generates a set of coefficients corresponding to the set of basis functions based on one or more commands issued to the robot, one or more corresponding end effector positions implemented by the robot, and a sparsity constraint. The model generator generates the robot model by combining the set of basis functions with the set of coefficients. In doing so, the model generator disables specific basis functions that do not describe physical properties associated with the robot. The robot model can subsequently be used within a robot controller to generate commands for controlling the robot.

At least one technical advantage of the disclosed techniques relative to the prior art is that the disclosed techniques enable accurate robot controllers to be generated without having to determine any kinematic equations. Accordingly, situations where inaccurate robot controllers result from inaccurate modeling assumptions can be avoided. Another technical advantage is that the disclosed techniques can be used to generate a controller for a robot without any knowledge of the physical structure of the robot. Accordingly, the disclosed techniques can be implemented in situations where some or all of the robot structure cannot be observed and/or analyzed. These technical advantages represent one or more technological advancements over prior art approaches.

1. Some embodiments include a computer-implemented method for controlling a robot, the method comprising determining a first set of outputs generated by the robot in response to a first set of inputs, generating a first set of basis functions based on the first set of inputs and the first set of outputs, wherein the first set of basis functions describes one or more physical characteristics of the first robot, and causing the robot to perform a first action based on the first set of basis functions.

2. The computer-implemented method of clause 1, wherein the first set of inputs comprises one or more angular velocity commands transmitted to the robot to control one or more joints included in the robot.

3. The computer-implemented method of any of clauses 1-2, wherein the first set of outputs comprises one or more three-dimensional positions traversed by an end effector of the robot.

4. The computer-implemented method of any of clauses 1-3, wherein determining the first set of outputs comprises transmitting the first set of inputs to the robot, and determining a first set of positions that the robot traverses in response to the first set of inputs.

5. The computer-implemented method of any of clauses 1-4, wherein generating the first set of basis functions comprises generating a plurality of coefficients based on a plurality of basis functions, wherein each coefficient included in the plurality of coefficients corresponds to a different basis function included in the plurality of basis functions, determining a first set of coefficients included in the plurality of coefficients that have nonzero values, and determining one or more basis functions included in the plurality of basis functions that correspond to the first set of coefficients.

6. The computer-implemented method of any of clauses 1-5, wherein determining the first set of coefficients comprises applying a sparsity constraint to the plurality of coefficients.

7. The computer-implemented method of any of clauses 1-6, wherein each basis function included in the first set of basis functions corresponds to a different physical property of the robot.

8. Some embodiments include a non-transitory computer-readable medium storing program instructions that, when executed by a processor, cause the processor to control a robot by performing the steps of determining a first set of outputs generated by the robot in response to a first set of inputs, generating a first set of basis functions based on the first set of inputs and the first set of outputs, wherein the first set of basis functions describes one or more physical characteristics of the first robot, and causing the robot to perform a first action based on the first set of basis functions.

9. The non-transitory computer-readable medium of clause 8, wherein the first set of inputs comprises one or more angular velocity commands transmitted to the robot to control one or more joints included in the robot.

10. The non-transitory computer-readable medium of any of clauses 8-9, wherein the first set of outputs comprises one or more three-dimensional positions traversed by an end effector of the robot, and wherein the step of determining the first set of outputs comprises transmitting the first set of inputs to the robot, and determining a first set of positions that the robot traverses in response to the first set of inputs.

11. The non-transitory computer-readable medium of any of clauses 8-10, wherein the step of generating the first set of basis functions comprises eliminating from a plurality of basis functions any basis function that does not correspond to a physical property of the robot.

12. The non-transitory computer-readable medium of any of clauses 8-11, wherein the step of causing the robot to perform a first action comprises causing the robot to move an end effector of the robot from a current position to a second position towards a target position, and determining an error value based on the second position and the target position.

13. The non-transitory computer-readable medium of any of clauses 8-12, wherein the step of causing the robot to perform the first action further comprises determining that the error value exceeds a threshold value, and modifying the second position based on the first set of basis functions to reduce the error value.

14. The non-transitory computer-readable medium of any of clauses 8-13, wherein causing the robot to perform the first action further comprises computing a first set of angular velocities based on the error value, causing the end effector to move to the second position towards the target position based on the first set of angular velocities, computing a first set of end effector velocities based on the first set of basis functions and the first set of angular velocities, and updating the current position based on the first set of end effector velocities.

15. Some embodiments include a computer-implemented method for generating a controller for a robot, the method comprising generating a first set of basis functions based on one or more system parameters associated with the robot, generating a first set of coefficients based on the first set of basis functions and a sparsity constraint, wherein the sparsity constraint causes a subset of the first set of coefficients to have a value of zero, and generating the controller based on the first set of basis functions and the first set of coefficients, wherein the controller causes the robot to perform a first action.

16. The computer-implemented method of clause 15, wherein generating the controller comprises combining the first set of basis functions with the first set of coefficients to generate a model of the robot, and implementing an iterative control loop based on the model of the robot to generate the controller.

17. The computer-implemented method of any of clauses 15-16, wherein combining the first set of basis functions with the first set of coefficients causes a subset of the set of basis functions corresponding to the subset of the set of coefficients to be disabled.

18. The computer-implemented method of any of clauses 15-17, wherein the controller causes the robot to perform the first action by causing the robot to move an end effector of the robot from a current position to a second position towards a target position, determining an error value based on the second position and the target position, determining that the error value exceeds a threshold value, and modifying the second position based on the first set of basis functions to reduce the error value.

19. The computer-implemented method of any of clauses 15-18, wherein each coefficient included in the subset of the first set of coefficients corresponds to a basis function included in the first set of basis functions that does not correspond to a physical property of the robot.

20. The computer-implemented method of any of clauses 15-19, wherein a first system parameter included in the one or more system parameters corresponds to a robot type associated with the robot.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for controlling a robot, the method comprising:
   determining a first set of outputs generated by the robot in response to a first set of inputs;
   generating a plurality of basis functions based on the first set of inputs and the first set of outputs;
   generating a plurality of coefficients for the plurality of basis functions, wherein each coefficient included in the plurality of coefficients corresponds to a different basis function included in the plurality of basis functions and indicates a degree to which the corresponding basis function describes a physical property of the robot, wherein generating the plurality of coefficients comprises determining that a given basis function included in the plurality of basis functions does not describe a physical property of the robot, and in response, assigning a given coefficient included in the plurality of coefficients that corresponds to the given basis function a value of zero; and
   causing the robot to perform a first action based on a first set of basis functions included in the plurality of basis functions.

2. The computer-implemented method of claim 1, wherein the first set of inputs comprises one or more angular velocity commands transmitted to the robot to control one or more joints included in the robot.

3. The computer-implemented method of claim 1, wherein the first set of outputs comprises one or more three-dimensional positions traversed by an end effector of the robot.

4. The computer-implemented method of claim 1, wherein determining the first set of outputs comprises:
   transmitting the first set of inputs to the robot; and
   determining a first set of positions that the robot traverses in response to the first set of inputs.

5. The computer-implemented method of claim 1, further comprising generating the first set of basis functions comprising:
   determining a first set of coefficients included in the plurality of coefficients that have nonzero values; and
   determining one or more basis functions included in the plurality of basis functions that correspond to the first set of coefficients.

6. The computer-implemented method of claim 5, wherein determining the first set of coefficients comprises applying a sparsity constraint to the plurality of coefficients.

7. The computer-implemented method of claim 1, wherein each basis function included in the first set of basis functions corresponds to a different physical property of the robot.

8. A non-transitory computer-readable medium storing program instructions that, when executed by a processor, cause the processor to control a robot by performing the steps of:
   determining a first set of outputs generated by the robot in response to a first set of inputs;
   generating a plurality of basis functions based on the first set of inputs and the first set of outputs;
   generating a plurality of coefficients for the plurality of basis functions, wherein each coefficient included in the plurality of coefficients corresponds to a different basis function included in the plurality of basis functions and indicates a degree to which the corresponding basis function describes a physical property of the robot, wherein generating the plurality of coefficients comprises determining that a given basis function included in the plurality of basis functions does not describe a physical property of the robot, and in response, assigning a given coefficient included in the plurality of coefficients that corresponds to the given basis function a value of zero; and
   causing the robot to perform a first action based on a first set of basis functions included in the plurality of basis functions.

9. The non-transitory computer-readable medium of claim 8, wherein the first set of inputs comprises one or more angular velocity commands transmitted to the robot to control one or more joints included in the robot.

10. The non-transitory computer-readable medium of claim 8, wherein the first set of outputs comprises one or more three-dimensional positions traversed by an end effector of the robot, and wherein the step of determining the first set of outputs comprises:
    transmitting the first set of inputs to the robot; and
    determining a first set of positions that the robot traverses in response to the first set of inputs.

11. The non-transitory computer-readable medium of claim 8, further comprising the step of generating the first set of basis functions comprising eliminating from the plurality of basis functions any basis function that does not describe a physical property of the robot.

12. The non-transitory computer-readable medium of claim 8, wherein the step of causing the robot to perform a first action comprises:
    causing the robot to move an end effector of the robot from a current position to a second position towards a target position; and
    determining an error value based on the second position and the target position.

13. The non-transitory computer-readable medium of claim 12, wherein the step of causing the robot to perform the first action further comprises:
    determining that the error value exceeds a threshold value; and
    modifying the second position based on the first set of basis functions to reduce the error value.

14. The non-transitory computer-readable medium of claim 12, wherein causing the robot to perform the first action further comprises:
    computing a first set of angular velocities based on the error value;
    causing the end effector to move to the second position towards the target position based on the first set of angular velocities;
    computing a first set of end effector velocities based on the first set of basis functions and the first set of angular velocities; and
    updating the current position based on the first set of end effector velocities.

15. A computer-implemented method for generating a controller for a robot, the method comprising:
    generating a first set of basis functions based on one or more system parameters associated with the robot;
    generating a first set of coefficients based on the first set of basis functions and a sparsity constraint, wherein each coefficient included in the first set of coefficients corresponds to a different basis function included in the first set of basis functions and indicates a degree to which the corresponding basis function describes a physical property of the robot, wherein generating the first set of coefficients comprises determining that a given basis function included in the first set of basis functions does not describe a physical property of the robot, and in response, assigning a given coefficient included in the first set of coefficients that corresponds to the given basis function a value of zero; and generating the controller based on the first set of basis functions and the first set of coefficients, wherein the controller causes the robot to perform a first action.

16. The computer-implemented method of claim 15, wherein generating the controller comprises:

combining the first set of basis functions with the first set of coefficients to generate a model of the robot; and implementing an iterative control loop based on the model of the robot to generate the controller.

17. The computer-implemented method of claim 16, wherein combining the first set of basis functions with the first set of coefficients causes the given basis function included in the first set of basis functions corresponding to the given coefficient included in the first set of coefficients to be disabled.

18. The computer-implemented method of claim 15, wherein the controller causes the robot to perform the first action by:

causing the robot to move an end effector of the robot from a current position to a second position towards a target position;

determining an error value based on the second position and the target position;

determining that the error value exceeds a threshold value; and modifying the second position based on the first set of basis functions to reduce the error value.

19. The computer-implemented method of claim 15, wherein a first system parameter included in the one or more system parameters corresponds to a robot type associated with the robot.

* * * * *